H. RICHARDSON.
ELECTRICAL CONTROLLING MECHANISM FOR WEIGHING MACHINES.
APPLICATION FILED JULY 2, 1908.
955,693.
Patented Apr. 19, 1910.
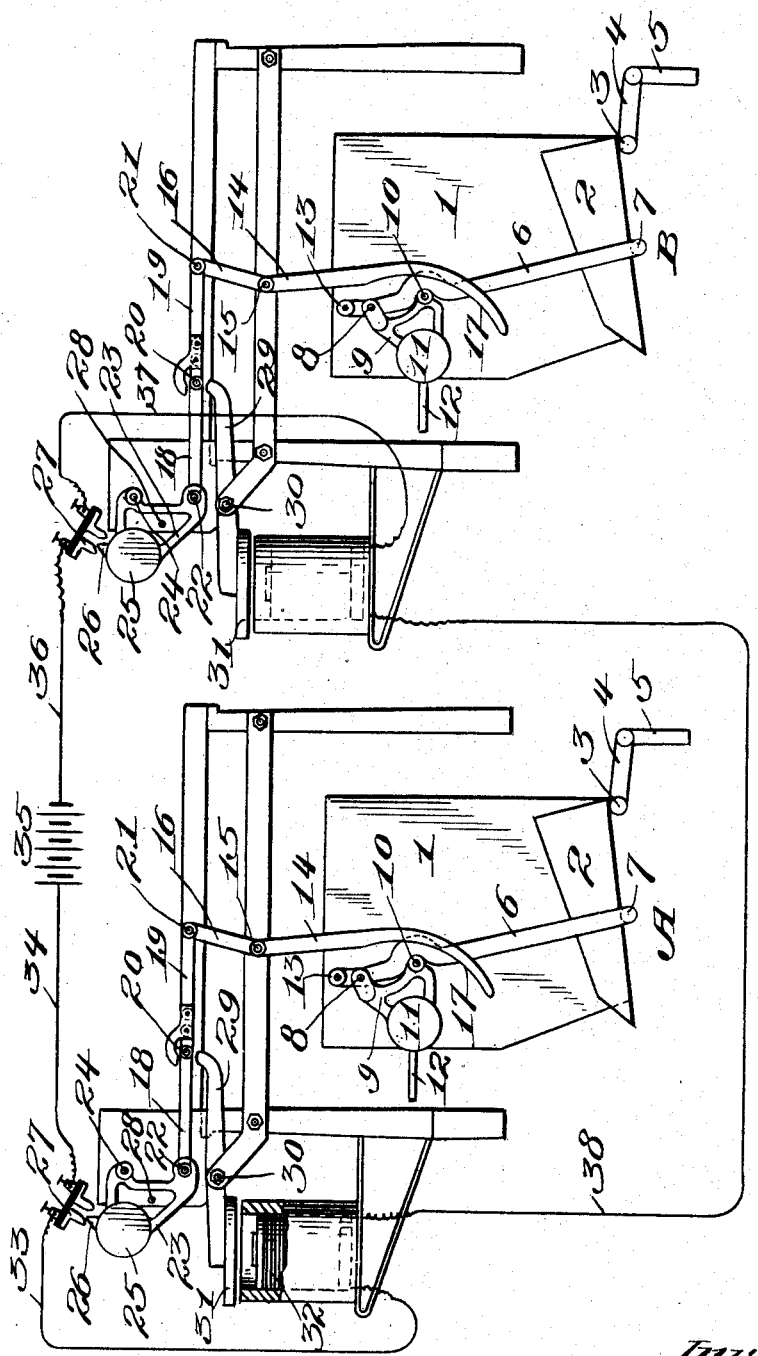

UNITED STATES PATENT OFFICE.

HENRY RICHARDSON, OF NEW YORK, N. Y.

ELECTRICAL CONTROLLING MECHANISM FOR WEIGHING-MACHINES.

955,693.  Specification of Letters Patent.  Patented Apr. 19, 1910.

Application filed July 2, 1908.  Serial No. 441,639.

*To all whom it may concern:*

Be it known that I, HENRY RICHARDSON, a subject of the King of Great Britain, residing at New York, in the county and State of New York, have invented certain new and useful Improvements in Electrical Controlling Mechanism for Weighing-Machines, of which the following is a specification.

My present invention relates to improvements in means for controlling the operation of weighing machines whereby the dumping of a number of such machines may be simultaneous, and it has for its object primarily to provide an electrical control of this character which is relatively simple in construction and is capable of being easily connected up to any desired number of weighing machines irrespective of their relative locations and which in practice serves to retain all of the machines of the set in locked condition until they are all in readiness to discharge, the electrical circuit at this moment being closed by all of the machines and thereupon operates devices which unlock the load discharging members.

A further object of the invention is to provide an electric control of the character set forth wherein the controlling mechanism is immediately restored to locking condition the moment the load discharging member of each weighing machine dumps a load, thereby preventing any of the weighing machines from discharging more frequently than the others of the set, the invention being capable of use to a special advantage in connection with weighing machines which serve to measure the charges in the mixing of different materials.

Another object of the invention is to provide a toggle mechanism for locking the load discharging member and to mount an electrically actuated member in coöperative relation with the toggle member whereby said electrically actuated member will operate upon said toggle member to unlock it and thereby permit the discharge of a load when the circuit of the controlling mechanism has been closed through all the machines of the set.

To these and other ends, the invention consists in certain improvements, and combinations and arrangements of parts, all as will be hereinafter more fully described, the novel features being pointed out particularly in the claims at the end of the specification.

The accompanying drawing is a diagrammatic view showing two weighing machines equipped with electrical mechanism for controlling the dumping or discharge thereof.

It is to be understood, of course, that electrical controlling mechanism embodying my invention is capable of use generally in connection with scales, weighing machines and analogous devices of various kinds and of any desired number, and while the invention is especially applicable for use in connection with machines that are employed for measuring or weighing the charges in the mixing of different materials whereby the simultaneous dumping or discharge of the charges is insured, the invention can, of course, be applied to weighing machines that are used for various purposes, the controlling mechanism serving in effect as an interlocking mechanism which prevents the discharge of one scale until the other scale or scales connected therewith is in readiness also to discharge.

The essential advantage of the present invention is, that the interlocking or controlling action upon the weighing machines is effected by electrical means, the construction of which is very simple and its nature permits any number of machines to be readily grouped for simultaneous operation irrespective of their relative locations so that it is possible to locate the machines to suit the conditions existing in the plant or factory in which they are installed without special attention being given to the electrical controlling or interlocking mechanism which is applied thereto.

In the present instance, I have shown diagrammatically the load discharging mechanism of two weighing machines which I have designated A and B, it being considered unnecessary to illustrate in this connection the weighing and other mechanisms which may be of any suitable construction. As each weighing machine shown in the present instance is a duplicate of the other, a description of one will be sufficient for both, each machine comprising a weigh hopper 1 having a load discharging member in the form of a door 2 which closes the bottom of the weigh hopper up to the time this hopper discharges its contents. This door or load discharging member is pivoted at its rear edge upon a shaft 3 which is provided with a crank 4 to which a suitable counterweight is attached by means of a rod 5, this construction being similar to that shown in a number of my prior patents. The door or load discharging member is also locked in closed position by means of toggle mechanism which is similar to the construction shown in some of my prior patents, and for the purposes of the present invention, this toggle mechanism may be described briefly as consisting of a member 6, the lower end of which is pivotally attached at 7 to the door or load discharging member, while its upper portion is attached by a center pivot 8 to a coöperating toggle member 9, the latter toggle member being mounted on a fixed pivot 10 which is in approximate alinement with the pivots 7 and 8 when the door or load discharging member is in locked position, a weight 11 serving to normally retain the toggle in locked condition, the member 9 being also provided with an arm 12 which is adapted to be engaged by a suitable part of the weighing mechanism whereby the toggle member 9 is lifted about its pivot, causing the center pivot 8 to move toward the right and thus break or unlock the toggle. The upper end of the toggle member 6 is provided with a roller or projection 13 which is adapted to engage a detaining arm or lever 14, as the said roller or projection moves toward the right to unlock the toggle, this arm 14 being mounted to swing on a fixed pivot 15 and is provided with an upper arm 16 which coöperates with a second toggle, the latter being controlled by the electrical devices and in turn it controls the movement of the detaining arm or lever. The lower end of the detaining arm or lever is provided with a curved portion 17 around which the roller or projection moves during the dumping of the door or load discharging member.

The second or electrically controlled toggle comprises a pair of members 18 and 19 which are connected by a center pivot 20, the outer end of the member 19 being pivotally attached at 21 to the arm 16 connected to the detaining lever while the outer end of the member 18 is pivotally attached at 22 to a circuit controlling member 23. The latter in the present instance has the general form of a bell-crank, the toggle member 18 being attached to the lower arm thereof while the bell-crank is mounted to turn about a fixed pivot 24, a weight 25 being formed on the bell-crank at a point offset laterally from its pivot, the weight normally tending to keep the circuit controlling member against the stop 28, the toggle members 18 and 19 falling into alinement by their own weight and thus hold the detaining lever or arm 14 in proximity to its operating projection or roller 13. The circuit closing member is provided with a contact 26 which is arranged to enter between and electrically connect a pair of stationary contacts 27 mounted in coöperative relation therewith, the turning movement of the circuit controlling member being limited in both directions by a stop 28.

While the electrically controlled toggle is in locked condition, the load discharging member of the respective machine is prevented from dumping, as will hereinafter appear, and the unlocking or breaking of this toggle is effected according to my present invention by means of an electrically operated member 29 which in the present instance is in the form of a lever mounted to turn about a fixed pivot 30, one end of the member being adapted to strike a blow at the middle portion of the electrically controlled toggle to unlock it, while its opposite end is provided with an armature 31 which is mounted in coöperative relation with a magnet 32.

The magnet of each machine in the set is connected in series with the stationary contacts which are closed by the member 23, the magnet 32 in the present instance, being connected by a conductor 33 to the stationary contacts 27 of the machine A while these contacts are connected by a conductor 34 to a battery or other source of current supply 35, the latter being connected by a conductor 36 to the stationary contacts of the machine B, and these contacts in turn are connected by a conductor 37 to the magnet of the machine B, the magnets being connected by the conductor 38. It will be understood, of course, that while I have illustrated one particular manner of connecting the magnets and circuit closing devices, any suitable arrangement of the circuit may be used, it being necessary only to extend suitable conductors between the machines of the set so that the magnets thereof will be energized only when the stationary contacts of all the machines have been electrically connected by the respective movable contacts.

In the present instance, I have illustrated the machines and the controlling mechanism therefor under those conditions prevailing before each weigh hopper has been fully loaded. As each weigh hopper receives the full charge of material, a part of the weighing mechanism of the respective machine will lift the arm 12, causing the center pivot 8 to move toward the right until it engages the detaining lever or arm 14. Each machine of the set performs the operation just described as soon as it receives the full load in the weigh hopper, and at this time, the toggle controlling the discharge member or door is unlocked and in readiness to release the door. The releasing of the door or load discharging member, however, is detained by the engagement of the projection or roller 13 with the detaining lever or arm which in turn is locked by the electrically controlled toggle. However, as the projection or roller 13 engages the detaining lever, the latter will be turned to a limited degree about its axis, causing the toggle members 18 and 19 to shift toward the left until the circuit closing member 23 engages the stop 28, such a movement of the circuit closing member causing the respective contact 26 thereon to engage and electrically connect the coöperating stationary contacts 27, the toggle members 18 and 19, however, remaining in locked condition. As soon, however, as all of the machines are in readiness to discharge their respective loads or charges, the electrical circuit connecting such machines will be closed, thereby causing the current to flow through the respective magnets to energize them. The moment the circuit is completed through the magnets on all the machines of the set, the respective levers will be actuated each delivering a sharp or hammer blow upon the middle portion of its respective toggle, each electrically controlled toggle being thereby unlocked or flexed upwardly, the pressure thereon due to the roller or projection 13 bearing against the detaining lever or arm causing a flexing of the toggle sufficient to enable the detaining lever to be pressed back by the roller 13, thereby permitting the doors or load discharging members of all the machines to simultaneously dump their respective charges. The moment the toggle members 18 and 19 are thus flexed, the weight on the circuit closing member 23 on each machine will cause these members to immediately drop or return to initial position, thus breaking the circuit on each machine. After the dumping of each load, the doors or load discharging members of the several machines return to closed position, as indicated in the drawing, the toggle members 6 and 9 returning to locked position, as shown, and as the roller 13 leaves the detaining lever, the latter is restored to its initial position, allowing the toggle members 18 and 19 to return to locked position, as shown. Obviously, before the machines can again discharge their respective loads, it is necessary for each machine to again receive the proper charge of material, the premature discharge of any of the machines being prevented by reason of the fact that the circuit is broken at each machine the moment of its discharge.

An electrical controlling mechanism embodying my invention is capable of being readily applied to weighing and similar machines of various kinds irrespective of their relative locations, and in operation it serves to positively prevent the discharge of any of the machines until all of them have received a predetermined charge. The apparatus not only provides means for controlling the discharge of a plurality of machines until all have received their proper charges, but it also operates to effect the simultaneous discharge of all the machines. It will be understood, of course, that the weighing mechanisms of the several machines need not necessarily be so set that each machine receives the same charge of material, but that on the other hand, the machines may be arranged to simultaneously discharge loads of different amounts according to the proportions of the ingredients used in the mixing operation. In the present instance, I have shown each machine as provided with a toggle mechanism for locking the door or load discharging member and a second toggle which is electrically controlled, and such an arrangement is generally preferable, but it will be understood, of course, that one of these toggles might be dispensed with in which case the electrically releasing member would be applied directly to the remaining toggle. It will also be understood that while I have shown and described the invention as applied to weighing machines, the invention is capable of use in connection with various machines wherein it is desirable or necessary to simultaneously discharge loads therefrom.

I claim as my invention:

1. A controlling mechanism of the class described comprising a load discharging member, a toggle for controlling the operation thereof, electrical means arranged to operate upon said toggle to permit movement of said discharging member and a circuit controller connected in circuit with said electrical means and arranged to open automatically when said member operates to discharge a load.

2. A controlling mechanism of the class described comprising a load discharging member, a toggle capable of locking said member, and electromagnetic means capable of delivering a blow upon said toggle to unlock it and permit a discharging movement of said member.

3. The combination of a machine having a load discharging member, a toggle capable of locking said member, and means including an electrical circuit having a circuit controller which is closed by a movement of said toggle for unlocking said toggle and permitting a discharging movement of said member.

4. The combination of a machine having a load discharging member, a toggle capable of locking said member, a circuit including a circuit controller adapted to be closed by a preliminary movement of said member, and means connected in said circuit for unlocking the toggle and permitting a discharging movement of said member.

5. The combination of a machine having a load discharging member, a toggle for locking said member, an electrical circuit having means for closing it upon a preliminary movement of said toggle, and means connected in said circuit for unlocking said toggle and permitting a discharging movement of the said member.

6. The combination of a machine having a load discharging member, a toggle for locking said member, a magnet adapted to be connected in an electrical controlling circuit, and a member operable by said magnet for unlocking said toggle and permitting movement of the load discharging member.

7. The combination of a machine having a load discharging member, a toggle for locking said member, a magnet adapted to be connected in an electrical controlling circuit, and a lever arranged to be acted upon by said magnet and adapted to strike a hammer blow upon an intermediate portion of said toggle to unlock the latter and permit a discharging movement of said member.

8. The combination of a plurality of machines having load discharging members, and electrical controlling means for insuring a simultaneous load-discharging movement of the said members and for preventing a subsequent independent discharging movement of any one of said load-discharging members.

9. The combination of a plurality of machines having load discharging members, and electrical means for causing automatic simultaneous discharging movement of the members on all of said machines and automatic means for setting said electrical means in inoperative condition simultaneously with the discharging movements of said members.

10. The combination of a plurality of machines having load discharging members, devices capable of locking the respective members, an electric circuit connecting the machines, means on the respective machines for closing said circuit when ready to discharge, and electro-magnetic devices connected in said ciruit for simultaneously releasing the said locking devices to permit discharging movements of the respective members.

11. The combination of a plurality of machines having load discharging members, and an electric circuit controllable by the load discharging member of each machine and having devices in circuit therewith for causing a simultaneous discharging movement of the said members and means for automatically opening said circuit simultaneously with the discharging movements of said members.

12. The combination of a plurality of machines having load discharging members, an electric circuit connecting said machines and adapted to be closed when the latter are in readiness to discharge their respective loads, devices connected in said circuit for effecting a simultaneous discharge of the machines, and means for opening said circuit substantially simultaneously with the discharging operation.

13. The combination of a weighing machine having a movable load discharging member, a toggle for locking said member, a second toggle having electrical means for breaking it, and a circuit closing member operable by the second toggle upon a preliminary movement of the toggle first mentioned.

14. The combination of a weighing machine having a load discharging member, a toggle for locking said member, a detaining lever for permitting a preliminary unlocking movement of said toggle, a second toggle controlling said detaining lever and adapted to receive a preliminary movement communicated to said detaining lever by the toggle first mentioned, a circuit closer operable by the said preliminary movement, an electric circuit adapted to be closed by said circuit closer, and a device connected in said circuit for unlocking the second toggle to permit a discharging movement of the load discharging member.

15. The combination of a weighing machine having a movable load discharging member, a toggle for locking said member, a detaining lever adapted to permit a preliminary movement of said member and to control the discharging operation thereof, a controlling toggle connected to the detaining lever, a pivoted circuit closing member attached to the controlling toggle and carrying a contact, an electrical circuit having contacts therein arranged to be closed by a movement of said circuit closing member due to a preliminary movement of the load discharging member, a magnet connected in said circuit, a member actuated by said magnet for breaking the controlling toggle, and means for immediately restoring the circuit closing member to inital position to break said circuit upon the discharge of the load.

In testimony whereof I have hereunto set my hand in presence of two subscribing witnesses.

HENRY RICHARDSON.

Witnesses:
 M. M. RONNER,
 H. E. LORBY.